United States Patent [19]

Lunz

[11] Patent Number: 5,078,956
[45] Date of Patent: Jan. 7, 1992

[54] NEUTRON FLUX DETECTOR DISTRIBUTION SYSTEM WITH IMPROVED DRIVABILITY

[75] Inventor: Kenneth G. Lunz, Fox Chapel, Pa.

[73] Assignee: Westinghouse Electric Corp., Pittsburgh, Pa.

[21] Appl. No.: 560,789

[22] Filed: Jul. 31, 1990

[51] Int. Cl.⁵ .................................... G21C 17/00
[52] U.S. Cl. ............................ 376/254; 376/245
[58] Field of Search .................... 376/254, 245; 250/390.1

[56] References Cited

U.S. PATENT DOCUMENTS

| | | | |
|---|---|---|---|
| 3,598,996 | 8/1971 | Haebler | 376/254 |
| 3,892,969 | 7/1975 | Warren | 250/390.1 |
| 4,363,970 | 12/1982 | Allen et al. | 250/390.1 |
| 4,381,451 | 4/1983 | Chen et al. | 250/390.1 |
| 4,887,469 | 12/1989 | Shoptaw | 73/861.77 |
| 4,966,747 | 10/1990 | Tower et al. | 376/254 |

Primary Examiner—Brooks H. Hunt
Assistant Examiner—Meena Chelliah

[57] ABSTRACT

A flux mapping system for a nuclear reactor uses a detector having an outer diameter approximately fifteen percent smaller than the inner diameter of distribution tubing through which it passes and a length less than eight percent of the minimum bend radius of the tubing. Frictionless limit switches are used in the flux mapping system to further reduce friction against cables which drive the detectors through the distribution tubing. In combination, these dimensions and switch changes result in a fifty percent improvement in driving force at the thimbles into the core of the nuclear reactor.

7 Claims, 4 Drawing Sheets

NEUTRON FLUX DETECTOR DISTRIBUTION SYSTEM WITH IMPROVED DRIVABILITY

BACKGROUND OF THE INVENTION

1. Field of the Invention

The present invention relates to flux mapping systems for nuclear reactors and, more particularly, to increasing drivability of detectors in a flux mapping system.

2. Description of the Related Art

Nuclear reactors include incore and excore detectors, i.e., detectors which are positioned inside the nuclear reactor core and detectors which are outside the core but inside the containment. Flux detectors, for example, may be used both inside the core and outside the core. In both cases, the flux detectors measure neutron flux emanating from the fuel in the core. The incore flux detectors are inserted into thimbles which pass through the core. The incore flux detectors are then drawn out of the core at a predetermined rate to produce a flux map along each thimble.

A flux detector distribution system supplies the flux detector to the thimbles in the core of a nuclear reactor. A pressurized water nuclear reactor typically has approximately 60 thimbles, but may have only four detectors. The flux detectors are mounted on the ends of cables which can be wound onto reels in drive units driven by motors. A network of tubing and multiple-path selectors enable any of the detectors from these reels to enter into any of the thimbles. Typically, if the driving force on the detector is 70 pounds when leaving the cable reel, the driving force when entering the thimbles ranges from 11.5 pounds to as little as five pounds.

Previous attempts to increase the driving force at the thimbles included adjusting the clutch mechanism in the cable reel drive to provide more force before the clutch would slip. This inevitably led to cable deformation problems. Another attempted solution was to replace conventional mechanical path verification switches with non-contact path verification switches to reduce friction on the cable. At best this resulted in only a ten percent increase in driving force.

SUMMARY OF THE INVENTION

An object of the present invention is to increase driving force at the thimbles in a flux mapping system.

Another object of the present invention is to reduce maintenance costs for a flux mapping system.

A further object of the present invention is to improve drivability while maintaining or improving reliability in a flux mapping system.

The above objects are attained by providing a cable distribution network for a cable having an outer diameter, the network comprising tubing having an inner diameter approximately fifteen percent larger than the outer diameter of the cable. A flux detector mounted on the end of the cable with an outer diameter substantially equal to the outer diameter of the cable preferably has an inflexible length which is less than eight percent of the radius of the tightest bend in the tubing. Frictionless limit switches, such as magnetic proximity switches, are used for path insertion verification and safety and withdraw limit switches.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
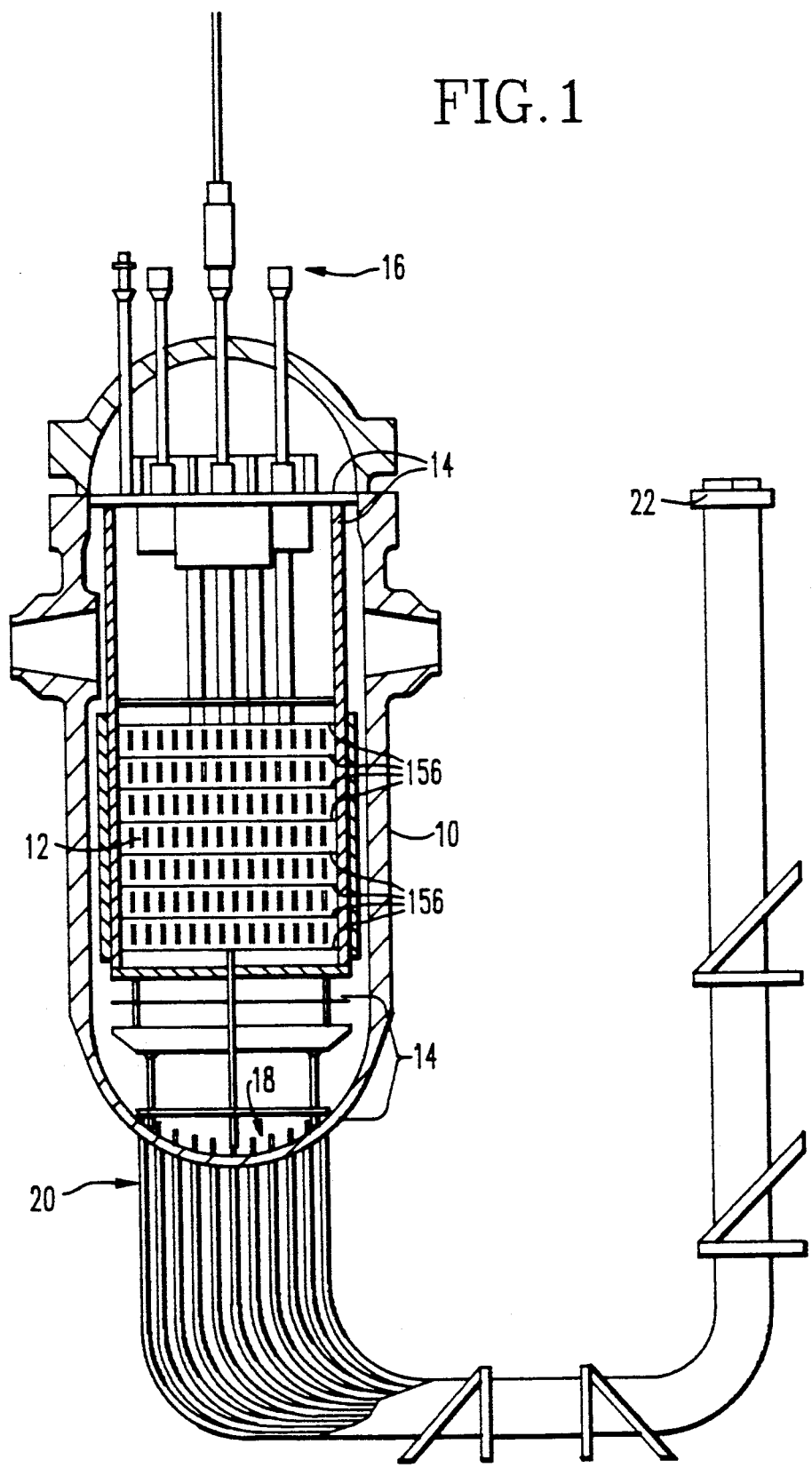
FIG. 1 is a schematic diagram of a nuclear reactor including an illustration of thimble guides.

As illustrated in FIG. 1, a nuclear reactor vessel 10 contains a fuel assembly 12 and support structures 14. Various instrumentation and drive devices 16 penetrate the vessel 10 from above. Thimble guide tubes 18 penetrate the vessel 10 from below. A flux mapping system includes distribution tubes 20 which run from a seal table 22 to the thimble guide tubes 18 to carry flux detectors (not shown) for mapping the core 12 of the reactor. The flux mapping system may be constructed as disclosed in U.S. Pat. No. 4,268,354, incorporated herein by reference.

Figure 2B:
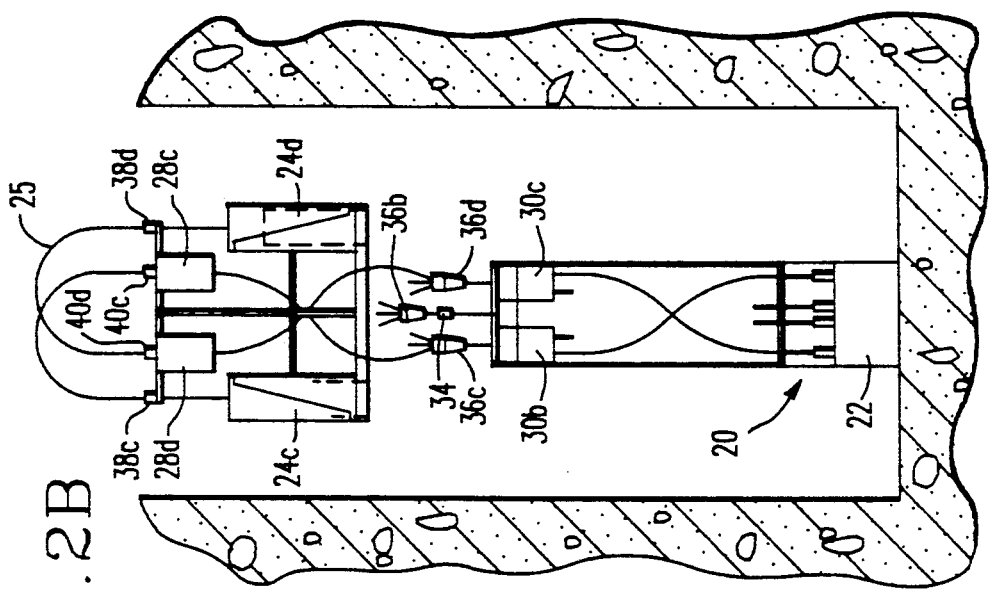
FIGS. 2A and 2B are front and side views of a drive system for a flux mapping system.
Figure 2A:
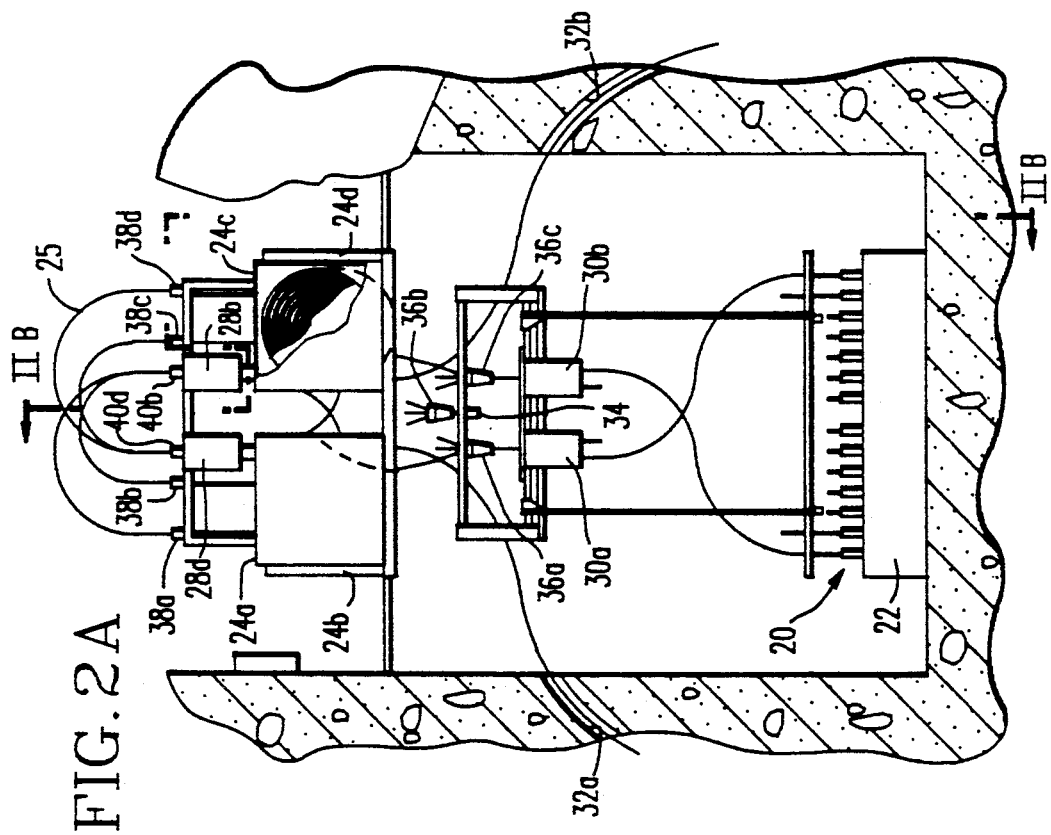

As illustrated in FIG. 2A, a typical drive system for a flux mapping system includes four detector drivers 24a–24d connected via supply tubing 25 to four corresponding six-path selectors 28b–28d (selector 28a corresponding to driver 24a is not illustrated in FIG. 2A or FIG. 2B). Each six-path selector 28 selects one of four fifteen-path selectors 30a–30c (the fourth fifteen-path selector is not visible in either FIG. 2A or FIG. 2B), or one of four detector storage conduits of which two (32a and 32b) are illustrated in FIG. 2A, or calibration path switch 34. The detector storage conduits 32 each correspond to one of the detector drivers 24. However, each of the fifteen-path selectors 30 and the calibration path switch 34 can receive detectors from any of the four detector drivers 24 via the 6-path selectors 28 and wyes 36a–36d (the fifth wye is not visible in either FIG. 2A or FIG. 2B).

Each fifteen-path selector 30 can select one of up to fifteen distribution tubes 20. Thus, up to 60 thimbles can be accessed by each detector driver 24 in the flux drive system arrangement illustrated in FIGS. 2A and 2B. Other arrangements are also possible using, e.g., ten-path selectors, to access a larger or smaller number of thimbles. Although the distribution tubes 20 are illustrated as ending a short distance above the seal table 22, they all extend to the fifteen-path selectors 30, but only two distribution tubes are illustrated in FIGS. 2A and 2B to simplify visualization of the connection between the selectors 30 and the seal table 22.

Safety limit switches 38a–38d detect the presence of the cable shortly after it issues from one of the drivers 24. The corresponding driver 24 is shut off if the safety limit switch 38 fails to detect presence of the cable. Withdraw limit switches 40b–40d (the withdraw limit switch corresponding to driver 24a is not illustrated in either FIG. 2A or FIG. 2B) detect withdrawal of the detector from the six-path selectors 28. The cable is normally stopped to position the detector between a safety limit switch 28 and a withdraw limit switch 40 while the six-path selector 28 selects a different output path.

Figure 3:
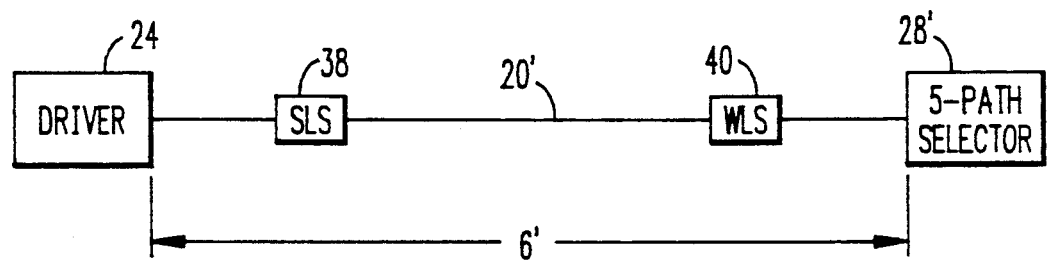
FIG. 3 is a block diagram of a prior art cable driver and associated multiple-path selector.

While FIGS. 1, 2A and 2B illustrate a typical arrangement of a flux mapping system, many other arrangements are possible. For example, a portion of a prior art flux mapping system is illustrated in FIG. 3 in which a straight line from each driver 24 to its corresponding five-path selector 28' passes through the corresponding safety limit switch 38 and the withdraw limit switch 40. In a prior art system having an arrangement like that illustrated in FIG. 3A, conventional sensors like that illustrated in FIG. 4A used in the safety 38 and withdraw 40 limit switches were replaced with non-contact sensors like that illustrated in FIG. 4B. The non-contact sensors were magnetic proximity switches 51 manufactured by General Equipment Corp., Model No. 713660.

Figure 4A:
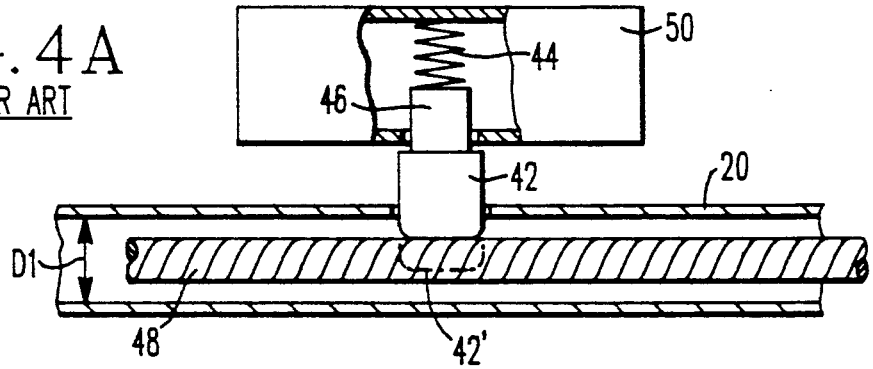
FIGS. 4A and 4B are illustrations of conventional and frictionless limit switches, respectively.

The conventional mechanical switch illustrated in FIG. 4A has a plunger 42 which is forced by a spring 44 and piston 46 into a distribution tube 20 when the cable 48 is not present, as indicated by the dashed lines 42'. When the detector is driven through the tube 20, the plunger 42 and piston 46 are driven into the switch housing 50 where electrical contact is made (not shown) to provide an indication that the cable 48 is present in the tube 20 at the location of the plunger 42. As illustrated in FIG. 4A, the plunger 42 continues to press against the cable 48 adding to the friction of the passage of the cable 48 through the tube 20.

Figure 4B:
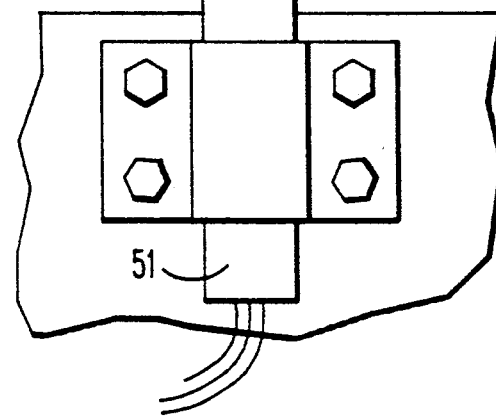

The non-contact switches used to improve the system illustrated in FIG. 3 were magnetic proximity switches 51 as illustrated in FIG. 4B. To ensure detection of the cable 48, tubing 20' with an inner diameter reduced from D1, e.g., 6.73 mm (0.265 in.) to D2, e.g., 5.44 mm (0.214 in.), was used between the driver 24 and the five-path selectors 28'. Alternatively, reduced diameter tubing could have been used only in the switches 38, 40 with adapters at the entrance and exit of each of the switches 38, 40 to attach to the conventional larger diameter tubing 20 illustrated in FIG. 4A. Since the distance between the drivers 24 and five-path selectors 28 was relatively short (less than 2 meters or about six feet) and the path was straight, it was simplest to use reduced diameter tubing 20' for the entire distance between each driver 24 and its corresponding five-path selector 28 without any need for concern regarding the possibility of binding at bends in the tubing 20'.

Figure 5:
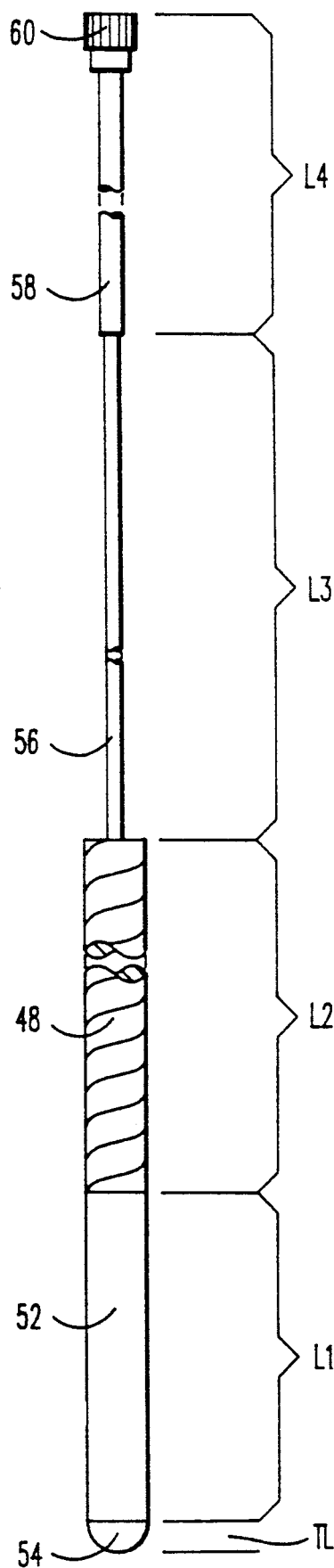
FIG. 5 is a plan view of a flux detector and drive cable according to the present invention.

The use of frictionless switches in the system illustrated in FIG. 3 only resulted in a five to ten percent increase in driving force at the thimble guide tubes 18. Careful analysis of the causes for loss in driving force in the detector distribution system indicates that a major contributor to loss in driving force is snaking of the cable 48 in the distribution tube 20. The loss in driving force can be significantly decreased by using reduced diameter tubing 20' throughout the detector distribution system. Alternatively, a larger cable can be used, provided the inner diameter of the thimbles 18 is sufficiently large. The end result should be tubing with an inner diameter that is no more than 25 percent larger than the outer diameter of the cable (and detector), and preferably, no more than fifteen percent larger. With a reduction in the inner diameter of the tubing, the minimum bend radius of the tubing must increase or the detector must be made smaller. To simplify installation in existing plants, the preferred embodiment uses a smaller detector as illustrated in FIG. 5. In a typical installation, the minimum bend radius is approximately 60 cm or 2 feet. According to the present invention, the length of the detector should be approximately seven percent of the minimum bend radius or less. It is also desirable to have a detector with as small a diameter as possible to reduce the possibility of dirt or corrosion in the distribution tube 20 causing blockage of the detector. Combining the use of frictionless switches with reduced diameter tubing and a reduced size detector can result in a fifty percent increase in the driving force at the thimbles compared to a conventional system.

A detector, together with a cable and an electrical connection for the detector, according to the present invention is illustrated in FIG. 5. In an example where the inner diameter D2 of the reduced diameter tubing 20' in FIG. 4B is 5.44 mm (0.214 in.) and the minimum bend radius is approximately 60 cm, the length L1 of the detector 52 is preferably 4.3 cm (1.7 in.) or less. It is also desirable to have the diameter D3 of the detector 52 as small as possible to reduce the likelihood that dirt or corrosion will cause blockage in the tubing 20. In this example, the diameter D3 may be approximately 4.67 mm (1.84 in.). As illustrated in FIG. 5, the detector 52, like a conventional detector, has a rounded tip 54 with a length TL of approximately 5 mm. With such a small detector, a monitor circuit like that disclosed in U.S. Pat. No. 4,853,174, incorporated herein by reference, may be used to ensure reliable detection of in-core neutron flux.

The outer diameter of the cable 48 is approximately the same as the outer diameter D3 of the detector 52. The cable 48 is hollow with an inner diameter of slightly more than 1 mm (0.04 in.) so that a mineral filled coaxial cable 56 having an outer diameter of 1 mm (0.04 in.) can be inserted therein. The mineral filled coaxial cable 56 electrically connects the detector 52 to a conventional coaxial cable 58 which ends in a conventional coaxial connector 60. The mineral filled coaxial cable 56 in this example has a length equal to L2+L3, where L2 is the length of the cable 48, e.g., 53 meters (175 ft.) and L3 is approximately 1.5 meters (5 ft.). The length L4 of the conventional coaxial cable 58 may be approximately 30 cm (12 in.).

The many features and advantages of the present invention are apparent from the detailed specification, and thus it is intended by the appended claims to cover all such features and advantages of the system which fall within the true spirit and scope of the invention. Further, since numerous modification and changes will readily occur to those skilled in the art from the disclosure of this invention, it is not desired to limit the invention to the exact construction and operation illustrated and described. For example, the proportions of the length and diameter of the detector to the minimum bend radius and inner diameter of the distribution tubing may apply to other applications where a cable is being driven through tubing. The length of the detector would correspond to the portion at the end of the cable which cannot bend beyond the inner diameter of the tubing and is thus substantially inflexible. Even a cable without a special tip will have some length at its free end, which does not substantially bend and may be taken as a substantially inflexible portion at the end of the cable. Accordingly, suitable modifications and equivalents may be resorted to, all falling within the scope and spirit of the invention.

What is claimed is:

1. A flux detector distribution system for a nuclear reactor flux mapping system using a cable to mechanically drive a flux detector into a nuclear reactor, comprising:

a flux detector, mounted on an end of the cable, said flux detector having an outer diameter and a length and being substantially inflexible; and tubing, for routing said flux detector and the cable to the nuclear reactor, said tubing having an inner diameter larger than the outer diameter of said flux detector by less than 25 percent and bends with a minimum bend radius, the length of said flux detector being less than eight percent of the minimum bend radius.

2. A flux detector distribution system as recited in claim 1, wherein the inner diameter of said tubing is larger than the outer diameter of said flux detector by less than 20 percent.

3. A flux detector distribution system as recited in claim 2, wherein the inner diameter of said tubing is approximately sixteen percent larger than the outer diameter of said flux detector, and wherein the length of said flux detector is approximately 6.5 percent to 7.5 percent of the minimum bend radius.

4. A flux mapping system for a nuclear reactor, comprising:

tubing, having an inner diameter and bends with a minimum bend radius;

at least one flux detector, substantially inflexible, having an outer diameter at most 25 percent smaller than the inner diameter of said tubing and a length less than eight percent of the minimum bend radius of said tubing; and drive means for mechanically driving said flux detector.

5. A flux mapping system as recited in claim 4, wherein said drive means comprises:

at least one cable having an outer diameter approximately equal to the outer diameter of said flux detector, each cable having an end with one of said flux detectors mounted thereon;

distribution means for distributing said at least one cable into said tubing and for driving said at least one flux detector into the nuclear reactor; and non-contact sensors for detecting presence of said cable at predetermined positions.

6. A flux mapping system as recited in claim 4, wherein said non-contact sensors are magnetic proximity switches.

7. A flux mapping system as recited in claim 4, wherein the inner diameter of said tubing is approximately 0.214 inch, the outer diameter of said at least one flux detector is approximately 0.184 inch and the length of said flux detector is approximately 1.70 inches.

* * * * *